US012559699B2

(12) United States Patent
Tamboli et al.

(10) Patent No.: US 12,559,699 B2
(45) Date of Patent: Feb. 24, 2026

(54) POST CHEMICAL MECHANICAL PLANARIZATION (CMP) CLEANER COMPRISING AN ORGANIC ACID/ANIONIC SURFACTANT MIXTURE

(71) Applicant: Versum Materials US, LLC, Tempe, AZ (US)

(72) Inventors: Dnyanesh Tamboli, Gilbert, AZ (US); Hee Min Hwang, Suwon-si (KR); Jeong Yun Yu, Hwaseong-si (KR)

(73) Assignee: Versum Materials US, LLC, Tempe, AZ (US)

( * ) Notice: Subject to any disclaimer, the term of this patent is extended or adjusted under 35 U.S.C. 154(b) by 371 days.

(21) Appl. No.: 18/042,008

(22) PCT Filed: Aug. 26, 2021

(86) PCT No.: PCT/US2021/047780
§ 371 (c)(1),
(2) Date: Feb. 17, 2023

(87) PCT Pub. No.: WO2022/047053
PCT Pub. Date: Mar. 3, 2022

(65) Prior Publication Data

US 2024/0026246 A1 Jan. 25, 2024

Related U.S. Application Data

(60) Provisional application No. 63/071,906, filed on Aug. 28, 2020.

(51) Int. Cl.

| | |
|---|---|
| ***C11D 1/37*** | (2006.01) |
| ***C11D 1/22*** | (2006.01) |
| ***C11D 1/72*** | (2006.01) |
| ***C11D 1/83*** | (2006.01) |
| ***C11D 3/00*** | (2006.01) |
| ***C11D 3/04*** | (2006.01) |
| ***C11D 3/20*** | (2006.01) |

(52) U.S. Cl.
CPC .................. *C11D 1/22* (2013.01); *C11D 1/72* (2013.01); *C11D 1/83* (2013.01); *C11D 3/0047* (2013.01); *C11D 3/0073* (2013.01); *C11D 3/046* (2013.01); *C11D 3/2075* (2013.01); *C11D 2111/22* (2024.01)

(58) Field of Classification Search
CPC .. C11D 1/12; C11D 1/143; C11D 1/37; C11D 1/72; C11D 1/722; C11D 1/83; C11D 3/48; C11D 7/28; C11D 9/225; C11D 2111/22
See application file for complete search history.

(56) References Cited

U.S. PATENT DOCUMENTS

| | | | | |
|---|---|---|---|---|
| 5,230,833 | A | 7/1993 | Romberger et al. | |
| 6,147,002 | A | 11/2000 | Kneer | |
| 6,440,856 | B1 | 8/2002 | Bessho et al. | |
| 6,498,131 | B1 | 12/2002 | Small et al. | |
| 6,730,644 | B1 | 5/2004 | Ishikawa et al. | |
| 7,084,097 | B2 | 8/2006 | Ishikawa et al. | |
| 7,163,644 | B2 | 1/2007 | Akahori et al. | |
| 7,396,806 | B2 | 7/2008 | Sakai et al. | |
| 7,427,362 | B2 | 9/2008 | Liu | |
| 7,497,966 | B2 | 3/2009 | Nam et al. | |
| 7,851,426 | B2 | 12/2010 | Nishiwaki et al. | |
| 2002/0025762 | A1 | 2/2002 | Luo et al. | |
| 2003/0129078 | A1 | 7/2003 | Beardwood et al. | |
| 2005/0067164 | A1 | 3/2005 | Ke et al. | |
| 2007/0190770 | A1 | 8/2007 | Kurashima et al. | |
| 2010/0167535 | A1* | 7/2010 | Nishiwaki ............ | C11D 3/2075 438/692 |
| 2011/0136717 | A1 | 6/2011 | Tamboli et al. | |
| 2013/0174867 | A1 | 7/2013 | Harada et al. | |
| 2019/0390139 | A1* | 12/2019 | Tamboli ............... | C11D 3/2082 |

FOREIGN PATENT DOCUMENTS

| | | | |
|---|---|---|---|
| JP | 11181494 | | 7/1999 |
| JP | 2008-027984 | A | 2/2008 |
| JP | 2010-171362 | A | 8/2010 |
| JP | 2012-074678 | A | 4/2012 |
| JP | 2020-004968 | A | 1/2020 |
| KR | 10-2011-0004336 | A | 1/2011 |
| WO | 2007092800 | A2 | 8/2007 |
| WO | 2012154498 | A2 | 11/2012 |
| WO | 2022/047053 | A1 | 3/2022 |

OTHER PUBLICATIONS

PCT/US2007/061588; Feb. 5, 2007; Barnes, Jeffrey A.; (WO2007092800).
International Search Report; PCT/US2021/047780; Dec. 17, 2021.
Supplementary European Search Report, The Hague, Application No. EP21862752, Aug. 16, 2024.
"International Preliminary Report on Patentability received for PCT Application No. PCT/US2021/047780, mailing date Mar. 9, 2023", 8 Pages.

* cited by examiner

*Primary Examiner* — Charles I Boyer
(74) *Attorney, Agent, or Firm* — Versum Materials US, LLC

(57) ABSTRACT

The present invention provides a cleaning composition comprises water; one or more organic acid; at least two surfactants wherein the first type surfactant is a diphenyl disulfonic surfactant, the second type surfactant has a surface tension of less than 50 dynes/cm at 0.01 wt % concentration in water, and the second type surfactant is not the first type surfactant; and optionally fluoride compounds, polymers, corrosion inhibitors, biological preservatives, pH adjusting agents.

18 Claims, 1 Drawing Sheet

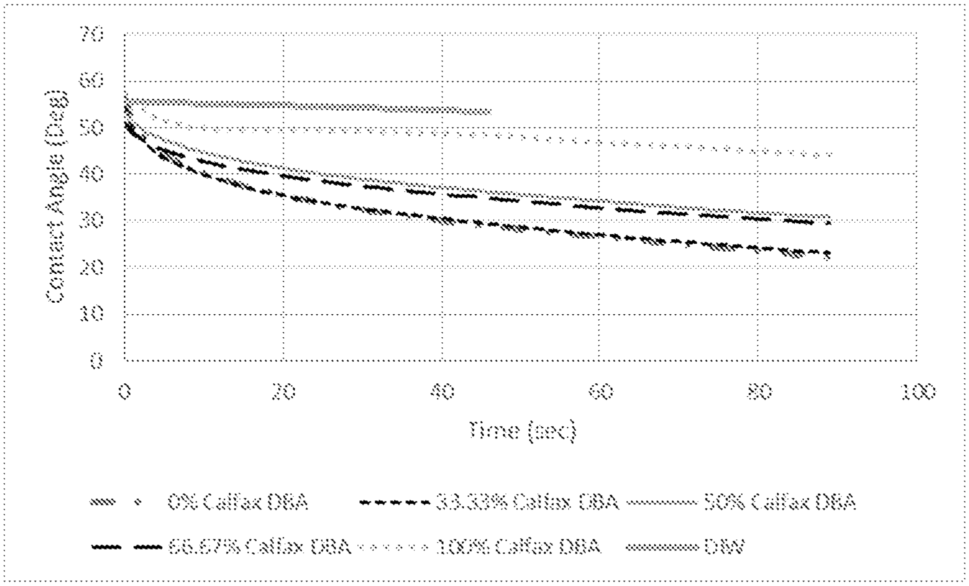
Contact Angle (Deg)
70
60
50
40
30
20
10
0
0
20
40
60
80
100
Time (sec)
0% Calfax DBA
33.33% Calfax DBA
50% Calfax DBA
66.67% Calfax DBA
100% Calfax DBA
DIW

POST CHEMICAL MECHANICAL PLANARIZATION (CMP) CLEANER COMPRISING AN ORGANIC ACID/ANIONIC SURFACTANT MIXTURE

CROSS REFERENCE TO RELATED APPLICATIONS

This application claims priority to U.S. provisional applications 63/071,906 filed on Aug. 28, 2020, the entire contents of which is incorporated herein by reference thereto for all allowable purposes.

BACKGROUND OF THE INVENTION

In the steps involving making of the semiconductor devices, cleaning is required at various steps to remove organic/inorganic residues. Cleaning to improve residue removal desired in semiconductor manufacturing processing, include; post-CMP (chemical mechanical planarization) cleaning, photo-resist ash residue removal, photoresist removal, various applications in back-end packaging such as pre-probe wafer cleaning, dicing, grinding etc.

A particular need for improved cleaning exists in post CMP cleaning of various structures formed by chemical mechanical planarization (CMP) process. CMP process involves polishing of one or more layers of films deposited on a wafer by pressing the wafer against a polishing pad with a CMP slurry providing the abrasive effect for material removal and provide planarity.

After the CMP step, the wafer surface contains a large number of defects, which if not cleaned from the surface would result in a defective chip as an end-product. Typical defects after a CMP process are inorganic particles, organic residues, chemical residues, reaction products on the surface due to interaction of the wafer surface with the CMP slurry and elevated levels of undesirable metals on the surface. After the polishing step, the wafer is cleaned, most commonly using a brush scrubbing process. During this process, a cleaning chemistry is dispensed on the wafer to clean the wafer. The wafer is also rinsed with deionized (DI) water before a drying process is performed.

Prior work has been done in the generally in the field of the present application include: US 2019/0390139, JP 11-181494; U.S. Pat. Nos. 6,440,856; 7,497,966 B2; 7,427,362 B2; 7,163,644 B2; PCT/US2007/061588; U.S. Pat. Nos. 7,396,806; 6,730,644; 7,084,097; 6,147,002; US 2003/0129078; and, US 2005/0067164.

As the technology advances, the threshold size and number of the defects that are critical for production yield of semiconductor wafers become smaller, thereby increasing the performance requirements of the post-CMP cleaners. The formulations or compositions (formulation and composition are exchangeable) in the present invention were found to be very effective in removing the residues left behind by the above described CMP polishing process.

BRIEF SUMMARY OF THE INVENTION

Described herein are post-CMP cleaning compositions or formulations, methods, and systems for the post-CMP processing.

In one aspect, described herein is a post-CMP cleaning composition (or formulations), comprising:

at least one organic acid or its salts;

at least two surfactants;

wherein at least one of the at least two surfactants is a first type surfactant having at least two sulfonic acid groups; and at least one of the at least two surfactants is a second type surfactant which is not the first type surfactant;

and water;

optionally fluoride compound;

water soluble polymer or copolymer;

corrosion inhibitor;

biological preservative; and pH adjusting agent.

The p-CMP cleaning composition has a pH between 1 and 7, preferably between 2 to 6, or more preferably 3 to 6.

The compositions can be diluted with DI water 2 to 500 times at the point of use.

Example of the first type surfactant includes but is not limited to a diphenyl disulfonic acid surfactant having diphenyl disulfonic acid or its salts.

Example of the second type surfactant includes but is not limited to the group consisting of non-ionic surfactant, anionic surfactant, cationic surfactant, ampholytic surfactant, and combinations thereof. Preferably the second type surfactant is selected from the group consisting of anionic surfactant, non-ionic surfactant, ampholytic surfactant, and combinations thereof; and more preferably the second type surfactant is selected from the group consisting of anionic surfactant, ampholytic surfactant showing anionic characteristics in the composition, and combinations thereof. In another preferred embodiment, the second type surfactant is a non-ionic surfactant. In another preferred embodiment, the second type of surfactant is a non-ionic surfactant containing ethylene oxide (EO) or polypropylene oxide (PO) groups or both EO and PO groups.

The second type surfactant can increase zeta potential magnitude on surface containing dielectric material.

The second type surfactant has a surface tension of <50 dynes/cm at concentration of 0.01 wt. % in water, preferably <45 dynes/cm at concentration of 0.01 wt. % in water, or more preferably <40 dynes/cm at concentration of 0.01 wt. % in water.

The second type surfactant can reduce the contact angle on cleaning surfaces.

Surfactant concentrations of either surfactant type can be between 0.001 to 2 wt. %, preferably in the range of 0.01 to 0.75 wt. %, or more preferably between 0.01 to 0.5 wt. %.

Formulations optionally comprise a fluoride compound. Examples of fluoride compounds include hydrofluoric acid, ammonium fluoride, ammonium bifluoride, quaternary ammonium fluorides. Preferred compound is ammonium fluoride. Concentration of fluoride component in the formulation is preferably in the range of 1 to 25 wt. %, preferably between 1.25 to 20 wt. %, more preferably between 1.5 and 15, or most preferably between 2 and 10 wt. %.

Formulations may optionally comprise one or more water soluble polymers or copolymers. The polymer may be selected from but not limited to a group comprising acrylic acid—acrylamido propane sulfonic acid copolymer, poly (acrylic acid), poly(meth-acrylic acid), poly(2-acrylamido-2-methyl-1-propanesulfonic acid, carboxymethyl cellulose, methyl cellulose, hydroxypropyl methyl cellulose, poly-(1-vinylpyrroliddone-co-2-dimethylaminoethyl methacrylate), poly(sodium 4-styrenesulfonate), poly(ethylene oxide), poly (4-sytrenesulfonic acid), polyacrylamide, poly(acrylamide/acrylic acid) copolymers, and combinations thereof, and salts thereof. In preferred embodiments, the polymer is a polymer or copolymer comprising polyacrylic acid or sulfonic acid groups.

The water soluble polymers or copolymers is used in concentration ranging from 0.01 to 10 wt. %, or preferably between 0.1% to 5 wt. %.

Formulations optionally comprise organic acids selected from a group comprising of monocarboxylic acids, dicarboxylic acids, hydroxycarboxylic acids and polycarboxylic acids. Examples include but are not limited to oxalic acid, citric acid, maleic acid, malic acid, malonic acid, gluconic acid, glutaric acid, ascorbic acid, formic acid, acetic acid, ethylene diamine tetraacetic acid, diethylene triamine pentaacetic acid, glycine, α-alanine, and cystine. Preferred organic acids are oxalic acid and citric acid. Organic acid concentration in the formulation may be in the range of 1 to 30 wt. %, or more preferably between 5 to 20%.

The compositions of this invention can be used for cleaning semiconductor wafers comprising at least one or more of metallic or dielectric films on the surface. Metallic films may comprise interconnect metal lines or vias comprising copper, tungsten, cobalt, aluminum, ruthenium, or their alloys. The dielectric layer can be silicon oxide films such as those derived from Tetra Ethyl Ortho Silicate (TEOS) precursors, dielectric films with one or more elements such as silicon, carbon, nitrogen, oxygen, and hydrogen. Dielectric films can be porous or non-porous or the structures may comprise air gaps.

In another aspect, described herein is a method of post Chemical Mechanical Planarization (CMP) cleaning semiconductor wafer comprising at least one surface selected from the group consisting of metallic film, dielectric film, and combinations thereof, comprising

- providing the semiconductor wafer;
- providing the post Chemical Mechanical Planarization (CMP) cleaning composition stated above; and
- cleaning the semiconductor wafer using the post CMP cleaning composition;
- wherein the metallic film is selected from the group consisting of tungsten, copper, cobalt, ruthenium, aluminum, and combinations thereof.

Wherein the method removes metallic residues selected from the group consisting of Fe, W, Ti, TiN and combinations thereof from the at least one surface.

Cleaning compositions may be used for cleaning the wafer surface with various types of cleaning techniques including but not limited to brush box cleaning, spray cleaning, megasonic cleaning, buff cleaning on a pad, single wafer spray tools, batch immersion cleaning tools, etc.

In yet another aspect, described herein is a system for post Chemical Mechanical Planarization (CMP) cleaning semiconductor wafer comprising at least one surface selected from the group consisting of metallic film, dielectric film, and combinations thereof, comprising

- the semiconductor wafer; and
- the post Chemical Mechanical Planarization (CMP) cleaning composition stated above;
- wherein the at least one surface is in touch with the post CMP cleaning composition and the metallic film is selected from the group consisting of tungsten, copper, cobalt, ruthenium, aluminum, and combinations thereof.

In certain preferred embodiments, the cleaning composition when diluted with water can etch the dielectric films at an etch rate preferably between 0.2 to 50 Angstroms/min, or more preferably between 1 and 20 Angstroms/min., or most preferably between 1 to 10 angstroms/min.

In certain preferred embodiments, the cleaning composition when diluted with water can etch dielectric films at etch rate between 1 to 10 Angstroms/min and etch tungsten at etch rates less than 1 Angstroms/min and etch titanium nitride films at etch rates less than 5 angstroms/min at room temperature.

BRIEF DESCRIPTION OF SEVERAL VIEWS OF THE DRAWINGS

In the accompanying drawing forming a material part of this description, there is shown:

FIG. 1: Contact angle as a function of time in formulations with different ratios of the two surfactants

DETAILED DESCRIPTION OF THE INVENTION

Described and disclosed herein are compositions for cleaning in semiconductor manufacturing including post-CMP (chemical mechanical planarization) cleaning, photoresist ash residue removal, photoresist removal, various applications in back-end packaging such as pre-probe wafer cleaning, dicing, grinding etc. The formulations are most suitable as post-CMP cleaning formulations.

Formulations of this invention are especially useful for post-CMP cleaning formulations after CMP processes including metal CMP processes wherein CMP process leads to formation of metallic interconnect structures surrounded by dielectric and dielectric CMP processes wherein one or more dielectrics are polished to form a planar surfaces or structures. Examples of metal CMP processes include but not limited to tungsten CMP, copper CMP, cobalt CMP, ruthenium CMP, aluminum CMP wherein metallic lines or vias separated by a dielectric region are formed. Examples of dielectric CMP include Shallow Trench Isolation (STI) CMP wherein silicon oxide structures are formed separated by silicon nitride regions and Inter Layer Dielectric (ILD) polish.

In one of the preferred embodiments, cleaning formulations of this invention are used for post-CMP cleaning after tungsten CMP. Formulations of this invention are especially effective for removal of metallic residues such as Fe, W, Ti and TiN that are typically formed on the wafer surface after tungsten CMP, while at the same time significantly improving organic and inorganic residue removal capabilities. Formulations of this invention are suitable for reducing the corrosion of tungsten, lowering surface roughness, and reducing galvanic corrosion between tungsten and liner materials.

Cleaning formulations are made in water as the solvent. Formulations are preferably made in a concentrate form, where in the cleaning formulation is diluted with water at the point of use in order to reduce cost of manufacturing, shipping and handling even as the formulations may be supplied as point of use formulation as well. The concentrated formulations may be diluted at point if use from 1× (1 part formulation: 1 part water by weight) to 1000× (1 part formulation to 1000 parts of water by weight). Concentrations provided for the additives in the cleaning formulations are for concentrates that can be diluted in the range of 1× to 1000×, or preferably between 5× to 100× or most preferably between 25× and 75×.

The post Chemical Mechanical Planarization (CMP) cleaning composition comprising:

- at least one organic acid or its salts;
- at least two surfactants;

wherein at least one of the at least two surfactants is a first type surfactant having at least two sulfonic acid groups; and at least one of the at least two surfactants is a second type surfactant which is not the first type surfactant;

and water;

optionally fluoride compound;

water soluble polymer or copolymer;

corrosion inhibitor;

biological preservative; and pH adjusting agent.

Organic acids or mixtures thereof: Organic acid can be chosen from a broad range of acids, such as monocarboxylic acids, dicarboxylic acid, polycarboxylic acids, hydroxycarboxylic acids, or mixtures thereof. Specific examples of organic acids include but not limited to; oxalic acid, citric acid, maleic acid, malic acid, malonic acid, gluconic acid, glutaric acid, ascorbic acid, formic acid, acetic acid, ethylene diamine tetraacetic acid, diethylene triamine pentaacetic acid, glycine, α-alanine, cystine etc. Polycarboxylic acid are organic acid molecules with multiple carboxylic acid groups. Polymers with monomers containing carboxylic acid groups is not considered as polycarboxylic acid in this application. Salts of organic acids may also be used. A mixture of acids/salts may be used as well. Organic acids function to improve trace metal removals, remove organic residues, pH adjustment or reduce corrosion of metals.

In one embodiment, the cleaning composition comprises one or more organic acids selected comprising oxalic acid, citric acid, malonic acid, glycine, and α-alanine. In another embodiment of the cleaning composition the comprises a mixture of oxalic acid, citric acid, and malonic acid. In another preferred embodiment organic acid contains citric acid. In another embodiment organic acid comprise a mixture of citric acid and oxalic acid.

The cleaning chemistry may contain from 0.1 wt. % to 30 wt. % of the organic acids and or salts thereof. Preferred acid concentration ranges from 5 wt. % to 20 wt. %.

In some preferred embodiments, the first type surfactant will have two or more sulfonic acid groups. A preferred surfactant is a surfactant having diphenyl disulfonic acid or its salt.

Example of surfactants with such structure include (a)

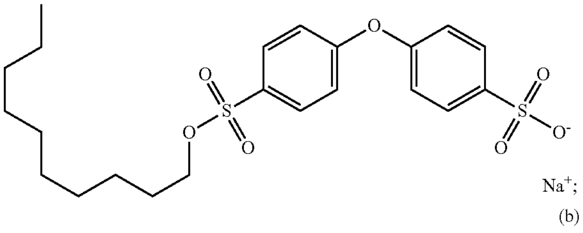

(b)

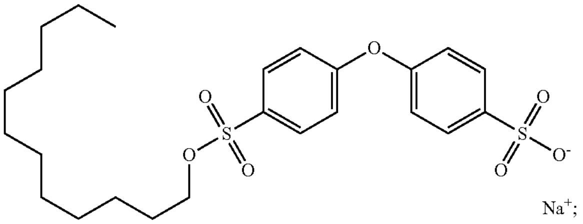

-continued (c)

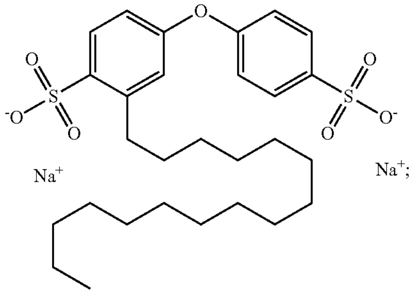

(d)

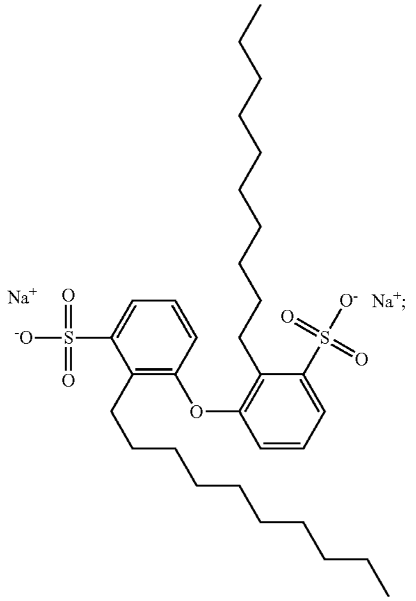

(e)

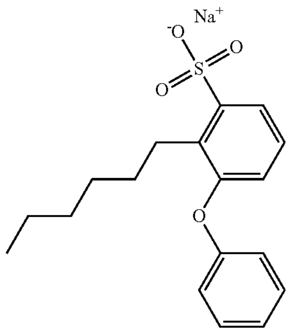

; and

-continued (f)

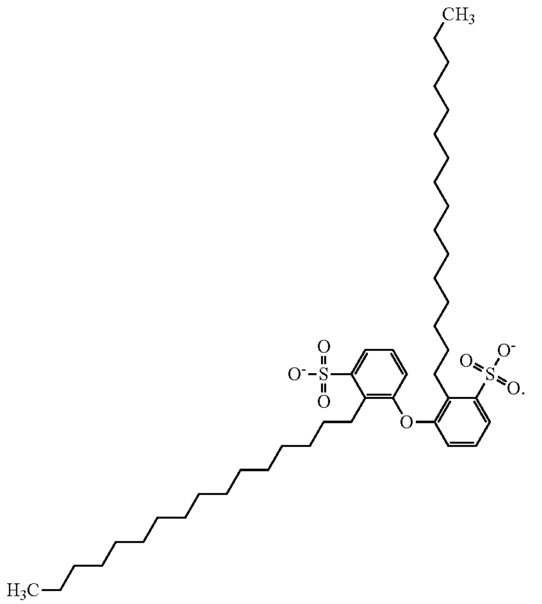

Some of the commercially available anionic surfactants with diphenyl disulfonic acids include Dowfax® series by Dow Chemical Company: Dowfax™ 2A1 (structure b), Dowfax™ 3b2 (structure d), Dowfax™ C6L (structure e) and Dowfax™ 8390 (structure f); and Calfax® series by Pilot Chemical Company: Calfax® DBA-70; Calfax®10L-45, Calfax® 16L-35, Calfax® 6LA-70. For the semiconductor applications, requiring high purity chemicals with very low levels of mobile ions such as sodium, surfactant solutions can be purified by any suitable technique including ion exchange to remove metal ions.

Post-CMP formulations also comprise at least one second type surfactant which does not contain diphenyl disulfonic acid group. Suitable second type surfactants include non-ionic surfactants, anionic surfactants, cationic surfactants, ampholytic surfactants, and mixtures thereof. The purpose of the second type surfactant is to provide the solution properties that are not possible with use of diphenyl disulfonic acid surfactants by themselves.

Solutions containing diphenyl disulfonic acid surfactants typically have somewhat high surface tension and higher contact angles on cleaning surfaces. The second type surfactant with suitable characteristics may also provide additional benefits in terms of surface modification of various film surfaces, particles, residues; which may improve the cleaning performance of the post-CMP cleaning solution. Therefore, a second type surfactant with better wetting properties is desired in combination with the diphenyl disulfonic acid surfactant. In the preferred embodiments, the second type surfactant has a surface tension of <50 dynes/cm at concentration of 0.01 wt. % in water, or more preferably <45 dynes/cm at concentration of 0.01 wt. % in water or most preferably <40 dynes/cm at concentration of 0.01 wt. % in water.

Non-ionic surfactants may be chosen from a range of chemical types including but not limited to long chain alcohols, ethoxylated alcohols, ethoxylated acetylenic diol surfactants, polyethylene glycol alkyl ethers, proplylene glycol alkyl ethers, glucoside alkyl ethers, polyethylene glycol octylphenyl ethers, polyethylene glycol alkylpgenyl ethers, glycerol alkyl esters, polyoxyethylene glycol sorbiton alkyl esters, sorbiton alkyl esters, cocamide monoethanol amine, cocamide diethanol amine dodecyl dimethylamine oxide, block copolymers of polyethylene glycol and polypropylene glycol, polyethoxylated tallow amines, fluorosurfactants.

Anionic surfactants include, but are not limited to those with suitable hydrophobic tails and a anionic functional group, such as carboxylate, sulfate, sulfonate, secondary asulfonate, phosphate, bicarboxylate, bisulfate, biphosphate, such as alkoxy carboxylate, alkoxy sulfate, alkoxy phosphate, The counter ions for this type of surfactants include, but are not limited to potassium, ammonium and other positive ions. The hydrophobic group may comprise alkyl groups, aryl groups, alkoxy groups or combinations of thereof.

Cationic surfactants possess the positive net charge on major part of molecular frame. Cationic surfactants are typically halides of molecules comprising hydrophobic chain and cationic charge centers such as amines, quaternary ammonium, benzyalkonium, and alkylpyridinium ions.

In another aspect, the surfactant can be an ampholytic surfactant, which possess both positive (cationic) and negative (anionic) charges on the main molecular chains and with their relative counter ions. The cationic part is based on primary, secondary, or tertiary amines or quaternary ammonium cations. The anionic part can be more variable and include sulfonates, as in the sultaines CHAPS (3-[(3-Cholamidopropyl)dimethylammonio]-1-propanesulfonate) and cocamidopropyl hydroxysultaine. Betaines such as cocamidopropyl betaine have a carboxylate with the ammonium. Some of the ampholytic surfactants may have a phosphate anion with an amine or ammonium, such as the phospholipids phosphatidylserine, phosphatidylethanolamine, phosphatidylcholine, and sphingomyelins.

In another preferred embodiment, the second type surfactant is a non-ionic surfactant. In another preferred embodiment, the second type of surfactant is a non-ionic surfactant containing ethylene oxide (EO) or polypropylene oxide (PO) groups or both EO and PO groups. Example of preferred second type surfactant is a surfactant comprising a secondary alkane sulfonic acid with C12-C17 hydrophobic chain; such as the anionic surfactant Hostapur SAS® series by Clariant. Another example of preferred second type of surfactant is Tergitol® Minfoam 1× by Dow Chemicals Formulations comprise at least one surfactant with two or more anionic groups. Without being hold to a particular theory, it may be theorized that surfactants with two or more anionic groups will likely have sufficient electrostatic field even in high ionic solutions. Therefore, the surfactant solutions will be stable against surfactant molecules collapsing into a structure that makes the solution turbid.

The molecular weight of surfactant as measured by any suitable technique such as but not limited to Gel Permeation Chromatography (GPC) may range from one hundred to over 10 million.

Surfactant concentrations of either surfactant type can be between 0.001 to 2 wt. %, preferably in the range of 0.01 to 0.75 wt. %, or more preferably between 0.01 to 0.5 wt. %.

Cleaning formulation may optionally comprise a water soluble polymeric additive. Polymer may be a homopolymer or copolymer. The polymer may be selected from but not limited to a group comprising acrylic acid-acrylamido propane sulfonic acid copolymer, poly(acrylic acid), poly(methacrylic acid), poly(2-acrylamido-2-methyl-1-propanesulfonic acid, carboxymethyl cellulose, methyl cellulose, hydroxypropyl methyl cellulose, poly-(1-vinylpyrroliddone-co-2-dimethylaminoethyl methacrylate), poly(sodium 4-styrenesulfonate), poly(ethylene oxide), poly(4-sytrenesulfonic acid), polyacrylamide, poly(acrylamide/acrylic acid) copolymers, and combinations thereof, and salts thereof. Molecular weight of the polymers measured by suitable technique such as GPC (gel permeation chromatography) may range from 100 to 10,000,000.

Preferred polymers are polymers comprising of sulfonic acid group, acrylic acid group or copolymers of monomers with sulfonic acid and acrylic acid groups.

Addition of the polymers to post CMP formulations with appropriate bases leads to great improvement in cleaning performance. The mechanism of cleaning improvement is still under study. One likely mechanism may be physical adsorption on surfaces, which would prevent re-deposition of removed particles and other residues. Another likely mechanism is the strong affinity towards the residues (organics) thereby increasing the driving force on lift-off during the cleaning process.

These types of polymers or mixtures thereof can be added in concentrations from 0.01 to 10 wt. % to the cleaning formulations. A preferred concentration range is between 0.1% to 5 wt. %. The formulations may be diluted by a by a factor of 2 to 500 at point of use through addition of solvent, such as water. Alternatively, the formulations may be supplied in diluted form for the direct use without the dilution at the point of use.

Formulations also optionally comprise a fluoride compound. Examples of fluoride compounds include hydrofluoric acid, ammonium fluoride, ammonium bifluoride, quaternary ammonium fluorides. Preferred compound is ammonium fluoride. Concentration of fluoride component in the formulation is between 1 to 25 wt. %, preferably between 1.25 to 20 wt. %, more preferably between 1.5 and 15, or most preferably between 2 and 10 wt. %; wherein the formulation is diluted 2 to 500 times at the point of use.

Inorganic acids, such as nitric acid, sulfonic acid, or phosphoric acid can be used as pH adjusting agent. Inorganic base, such as ammonia hydroxide, potassium hydroxide or sodium hydroxide, organic bases such as quaternary ammonium hydroxides, various amine compounds can also be used for pH adjusting agent.

pH of the formulation is preferably between 1 and 7, preferably between 2 and 6 or most preferably between 3 and 6.

Formulations can be diluted with DI water 2 to 500 times at the point of use.

For post-CMP cleaning formulations, there may be additional components present which help with cleaning performance. Common types of additives include the following.

The cleaning chemistry may optionally contain chelating agent.

Since a chelating agent may be more selective with regard to one metal ion over another, a plurality of chelating agents or salts thereof are used in the compositions described herein. It is believed that these chelating agents may bind to metal ion contaminants on the substrate surface and dissolve them into the composition. Further, in certain embodiments, the chelating agent should be able to retain these metal ions in the composition and prevent the ions from re-depositing on the substrate surface. Examples of suitable chelating agents that may be used include, but are not limited to: ethylenediaminetetracetic acid (EDTA), N-hydroxyethylethylenediaminetriacetic acid (NHEDTA), nitrilotriacetic acid (NTA), diethylklenetriaminepentacetic acid (DPTA), ethanoldiglycinate, citric acid, gluconic acid, oxalic acid, phosphoric acid, tartaric acid, methyldiphosphonic acid, aminotrismethylenephosphonic acid, ethylidene-diphosphonic acid, 1-hydroxyethylidene-1,1-diphosphonic acid, 1-hydroxypropylidene-1,1-diphosphonic acid, ethylaminobismethylenephosphonic acid, dodecylaminobismethylenephosphonic acid, nitrilotrismethylenephosphonic acid, ethylenediaminebismethylenephosphonic acid, ethylenediaminetetrakismethylenephosphonic acid, hexadiaminetetrakismethylenephosphonic acid, diethylenetriaminepentamethylenephosphonic acid and 1,2-propanediaminetetetamethylenephosphonic acid or ammonium salts, organic amine salts, maronic acid, succinic acid, dimercapto succinic acid, glutaric acid, maleic acid, phthalic acid, fumaric acid, polycarboxylic acids such as tricarbaryl acid, propane-1,1,2,3-tetracarboxylic acid, butane-1,2,3,4-tetracarboxylic acid, pyromellitic acid, oxycarboxylic acids such as glycolic acid, .beta.-hydroxypropionic acid, citric acid, malic acid, tartaric acid, pyruvic acid, diglycol acid, salicylic acid, gallic acid, polyphenols such as catechol, pyrogallol, phosphoric acids such as pyrophosphoric acid, polyphosphoric acid, heterocyclic compounds such as 8-oxyquinoline, and diketones such as .alpha.-dipyridyl acetylacetone.

The chelating agent may be used at a concentration ranging from 0.01 wt. % to 30 wt. %

The cleaning chemistry may optionally contain defoaming compounds. The defoamer or an anti-foaming agent is a chemical additive that reduces and hinders the formation of foam in the formulation. The terms anti-foam agent and defoamer are often used interchangeably. Commonly used agents are insoluble oils, polydimethylsiloxanes and other silicones, certain alcohols, stearates and glycols, certain surfactants such as a combination of polyether surfactant and a polyhydric alcohol fatty acid ester, Surfynol MD20 surfactant from Evonik Chemicals. The defoaming compound may be used in a concentration ranging from 0.00001 wt. % to 0.01 wt. % in the cleaning formulation.

The cleaning chemistry may optionally contain biocide. CMP formulations may also comprise additives to control biological growth such as biocides. Some of the additives to control biological growth are disclosed in U.S. Pat. No. 5,230,833 (Romberger et al.) and U.S. patent application Publication No. 2002/0025762, which is incorporated herein by reference. Biological growth inhibitors include but are not limited to tetramethylammonium chloride, tetraethylammonium chloride, tetrapropylammonium chloride, alkylbenzyldimethylammonium chloride, and alkylbenzyldimethylammonium hydroxide, wherein the alkyl chain ranges from 1 to about 20 carbon atoms, sodium chlorite, sodium hypochlorite, isothiazolinone compounds such as methylisothiazolinone, methylchloroisothiazolinone and benzisothiazolinone. Some of the commercially available preservatives include KATHON™ and NEOLENE™ product families from Dow Chemicals and Preventol™ family from Lanxess.

The preferred biocides are isothiozilone compounds such as methylisothiazolinone, methylchloroisothiazolinone and benzisothiazolinone Formulations may comprise biocide ranging from 0.0001 wt. % to 0.10 wt. % preferably from 0.0001 wt. % to 0.005 wt. %, and more preferably from 0.0002 wt. % to 0.0025 wt. % to prevent bacterial and fungal growth during storage.

Chemistries may be used in a variety of cleaning applications, which demand removal of residues from a surface. The residues may be inorganic or organic in nature. Examples of processes, where formulations containing these polymers may be effective, include; post-CMP cleaning, photo-resist ash residue removal, photoresist removal, and various applications in back-end packaging, such as; pre-probe wafer cleaning, dicing, grinding etc. as well as cleaning of wafers for photovoltaic applications.

The compositions of this invention are especially suitable for cleaning semiconductor wafers comprising at least one or more of metallic or dielectric films on the surface. Metallic films may comprise interconnect metal lines or vias comprising copper, tungsten, cobalt, aluminum, ruthenium, Germanium-Antimony-Tellurium (GST), or their alloys. The dielectric layer can be silicon oxide films such as those derived from Tetra Ethyl Ortho Silicate (TEOS) precursors, dielectric films with one or more elements such as silicon, carbon, nitrogen, oxygen, and hydrogen. Dielectric films can be porous or non-porous or the structures may comprise air gaps.

Cleaning compositions may be used for cleaning the wafer surface with various types of cleaning techniques including but not limited to brush box cleaning, spray cleaning, megasonic cleaning, buff cleaning on a pad, single wafer spray tools, batch immersion cleaning tools, etc. or a combination of such methods.

In certain preferred embodiments, the cleaning composition when diluted with water can etch the dielectric films at an etch rate preferably between 0.2 to 50 Angstroms/min, or more preferably between 1 and 20 Angstroms/min at room temperature.

In some preferred embodiments, room temperature etch rates of metallic films (tungsten and titanium nitride) is very low, preferably less than 10 Angstroms/min, or more preferably less than 5 Angstroms/min or most preferably less than 2 Angstroms/min Formulations of this invention are especially suitable for post-CMP cleaning application for tungsten. Tungsten CMP results in metallic residues comprising W, Ti, and Fe, which can form invisible residues on the dielectric surface. These residues can increase leakage currents and reduce the effectiveness of the semiconductor devices. Titanium particularly is a very difficult to remove from the wafer surface as titanium is generally stable as solid oxide phase over a broad pH range. Formulations of this invention because of suitable organic acids and the dielectric etching capability are able to effectively remove the titanium residues and improve electrical performance of the devices.

It is desirable that the post-CMP cleaning solutions have low turbidity. Having high turbidity leads to interference in the measurement of number of particles present in the solution, which is critical for controlling the quality of the post-CMP cleaning solutions. Turbidity can be measured using any suitable optical technique. Turbidity values are typically measured by measurement of amount of light that is scattered by material in the solution when the light is shined through the solution sample. Higher the intensity of scattered light, the higher the turbidity. One of the commonly used units for turbidity measurement is Nephelometric Turbidity Unit (NTU). It is desirable that the post-CMP cleaning solution has a turbidity of less than 5 NTU, preferably less than 2.5 NTU, more preferably less than 2.0 NTU, or most preferably less than 1 NTU.

In another aspect, described herein is a method of post Chemical Mechanical Planarization (CMP) cleaning semiconductor wafer comprising at least one surface selected from the group consisting of metallic film, dielectric film, and combinations thereof, comprising providing the semiconductor wafer;

providing the post Chemical Mechanical Planarization (CMP) cleaning composition stated above; and cleaning the semiconductor wafer using the post CMP cleaning composition;

wherein the metallic film is selected from the group consisting of tungsten, copper, cobalt, ruthenium, aluminum, and combinations thereof.

Wherein the method removes metallic residues selected from the group consisting of Fe, W, Ti, TiN and combinations thereof from the at least one surface.

In yet another aspect, described herein is a system for post Chemical Mechanical Planarization (CMP) cleaning semiconductor wafer comprising at least one surface selected from the group consisting of metallic film, dielectric film, and combinations thereof, comprising the semiconductor wafer; and the post Chemical Mechanical Planarization (CMP) cleaning composition stated above;

wherein the at least one surface is in touch with the post CMP cleaning composition and the metallic film is selected from the group consisting of tungsten, copper, cobalt, ruthenium, aluminum, and combinations thereof.

In certain preferred embodiments, the cleaning composition when diluted with water can etch dielectric films at etch rate between 1 to 10 Angstroms/min and etch tungsten at etch rates less than 1 Angstroms/min and etch titanium nitride films at etch rates less than 5 angstroms/min at room temperature.

The cleaning compositions, methods and systems described herein will be illustrated in more detail with reference to the following examples, but it should be understood that it is not deemed to be limited thereto.

WORKING EXAMPLES

Example 1

Concentrate formulations were made as shown in Table 1.

The formulations were diluted 1 part formulation to 49 parts water by weight.

Zeta potentials on tungsten and TEOS surfaces were measured using Surface Zeta Potential cell on Zetasizer Nano tool (Malvern Instruments Inc. 117 Flanders Road Westborough MA 01581-1042) by adding high purity silica particles as trace particles.

Surfactants were used in the acid form.

The data shows that Calfax® DBA-70 by Pilot Chemical Company, 9075 Centre Pointe Drive, Suite 400, West Chester, OH 45069; which is a diphenyl disulfonic acid comprising $C_{12}$ hydrophobic chain is very effective for increasing the zeta potential magnitude on tungsten surface.

On the other hand, the second type surfactant (not a diphenyl disulfonic acid surfactant) Hostapur SAS® by Clariant (anionic surfactant) which is a secondary alkane sulfonic acid with $C_{12}$-$C_{17}$ hydrophobic chain, is more effective to increase zeta potential magnitude on TEOS surface.

TABLE 1

| Formulation Number | 1 | 2 | 3 | 4 | 5 |
|---|---|---|---|---|---|
| Citric Acid (wt. %) | 2.8 | 2.8 | 2.8 | 2.8 | 2.8 |
| Malonic Acid (wt. %) | 1.4 | 1.4 | 1.4 | 1.4 | 1.4 |
| Oxalic Acid (wt. %) | 2.8 | 2.8 | 2.8 | 2.8 | 2.8 |
| Polyacrylic Acid (wt. %) (Mol. Wt. 2000-20000) | 0 | 0.5 | 0.5 | 0.5 | 0.5 |
| Calfax ® DBA-70 (wt. %) | 0 | 0 | 0.2 | 0 | 0.2 |
| Hostapur ®SAS (wt. %) | 0 | 0 | 0 | 0.375 | 0.375 |

TABLE 1-continued

| Formulation Number | 1 | 2 | 3 | 4 | 5 |
|---|---|---|---|---|---|
| Ammonium Hydroxide (wt. %) | 0.8 | 0.8 | 0.8 | 0.8 | 0.8 |
| Water | Balance | Balance | Balance | Balance | Balance |
| pH | 2.55 | 2.55 | 2.55 | 2.55 | 2.55 |
| Tungsten Zeta potential (mV) | −0.65 | 2.47 | −21.4 | −10.2 | −24.3 |
| TEOS Zeta Potential (mV) | −4.16 | 1.74 | 1.05 | −21.2 | −20.3 |

Surface zeta potential change by surfactant strongly indicates ability to modify the film surfaces by adsorption and making them easy to clean. The increase in the magnitude of negative zeta potential is likely associated with anionic groups in the surfactant. pH of 2.55 was used to measure zeta potential change without the use of ammonium fluoride.

A combination of two surfactants one of which is diphenyl disulfonic acid form allows strong surface modification of both metallic (tungsten in this example) and dielectric (TEOS in this example) which is crucial for cleaning patterned wafers which contain both metallic and dielectric surfaces.

Example 2

Different formulations were made by adding both Calfax® DBA-70 and Hostapur® SAS surfactants to formulation 1 in Table 1.

Formulation 1 was first diluted 1 part formulation with 49 parts water by weight to make 50× dilution.

Surfactants were then added to the dilution. Total surfactant concentration in the dilution was fixed at 60 ppm.

The fraction of individual surfactant in the surfactant mixture was varied between 0 to 100% of the total surfactant amount.

A hydrophobic tungsten surface was created by holding the tungsten film at 50° C. for 4 days.

Contact angles were measured on the tungsten film surface as a function of time after placing the drop on the film. Measured contact angles are shown in FIG. 1.

As evident from this FIGURE, increasing the Calfax® DBA70 surfactant had a little impact on reducing the contact angles. The second type surfactant Hostapur® SAS is capable of lowering the contact angle very effectively (as shown in the curve with 0% Calfax DBA). By addition of including Calfax® DBA surfactant up to 33% of the total surfactant mixture, the contact angle on tungsten can still be reduced substantially.

Example 3

Formulation 6 was prepared as described in table 2.

TABLE 2

| Formulation Number | 6 |
|---|---|
| Citric Acid (wt. %) | 2.8 |
| Malonic Acid (wt. %) | 1.4 |
| Oxalic Acid (wt. %) | 2.8 |
| Ammonium Fluoride (wt. %) | 2.45 |
| Water | Balance |
| pH | 3-4 |

Surfactants at various concentrations were added in Formulation 6 as shown in Table 3.

In Table 3, Surfactant 1 was Dowfax® series by Dow Chemical Company. Surfactant 1 were diphenyl disulfonic acid surfactants with different structures.

The second type surfactant, Surfactants 2 Hostapur® SAS in Table 3 was not a diphenyl disulfonic acid surfactant.

Stability of the formulations was measured by turbidity measurement using Hatch turbidity testing tool. Table 3 summarizes the turbidity data.

Surfactants 2 Hostapur® SAS addition to formulation 6 results in very high turbidity (29.6) as evident from turbidity data for formulation 7.

However, adding the diphenyl disulfonic acid surfactants 1, the turbidity went down.

For most solutions containing these surfactants have turbidity less than 2NTU, which is indicative of a clear transparent solution. This shows the unexpected ability of the diphenyl disulfonic acid surfactants to solubilize the second surfactant.

TABLE 3

| Formulation# | Surfactant 1 | Surfactant 2 | Surfactant 1 wt. % | Surfactant 2 wt. % | Turbidity (NTU) |
|---|---|---|---|---|---|
| 6 | | | 0 | 0 | 0.261 |
| 7 | | Hostapur ® SAS | 0 | 0.375 | 29.5 |
| 8 | Dowfax ® 2A1 | Hostapur ® SAS | 0.01 | 0.375 | 26.2 |
| 9 | Dowfax ® 2A1 | Hostapur ® SAS | 0.05 | 0.375 | 1.58 |
| 10 | Dowfax ® 2A1 | Hostapur ® SAS | 0.075 | 0.375 | 1.32 |
| 11 | Dowfax ® 2A1 | Hostapur ® SAS | 0.1 | 0.375 | 1.1 |
| 12 | Dowfax ® 2A1 | Hostapur ® SAS | 0.15 | 0.375 | 0.92 |
| 13 | Dowfax ® 2A1 | Hostapur ® SAS | 0.2 | 0.375 | 0.633 |
| 14 | Dowfax ® 2A1 | Hostapur ® SAS | 0.3 | 0.375 | 0.673 |
| 15 | Dowfax ® 8390 | Hostapur ® SAS | 0.3 | 0.375 | 0.677 |
| 16 | Dowfax ® 8390 | Hostapur ® SAS | 0.3 | 0 | 0.665 |
| 17 | Dowfax ® 8390 | Hostapur ® SAS | 0 | 0.375 | 26.5 |
| 18 | Dowfax ® C6L | Hostapur ® SAS | 0.3 | 0.375 | 0.867 |
| 19 | Dowfax ® C6L | Hostapur ® SAS | 0.3 | 0 | 0.317 |

Example 4

Formulation 20 was prepared as described in table 4.

TABLE 4

| Formulation Number | 20 |
|---|---|
| Citric Acid (wt. %) | 3 |
| Benzene Sulfonic Acid (wt. %) | 3 |
| Oxalic Acid (wt. %) | 3 |
| Ammonium Fluoride (wt. %) | 2.5 |
| Water | Balance |
| pH | 3-4 |

To this formulation, surfactants at various concentrations (wt. %) were added as shown in Table 5.

Turbidity measurement of various surfactant combinations was performed using Hatch turbidity testing tool.

TABLE 5

| Formulation | Polyoxyethylene (20) sorbitan monolaurate (Tween 20) | Polyoxyethylene (40) sorbitan monolaurate (Tween 40) | PEG(80) sorbitan monolaurate | Pluronic 17R | Calfax ® DBA-40 | Turbidity (NTU) |
|---|---|---|---|---|---|---|
| 21 | 0.1 | | | | | 0.97 |
| 22 | 0.1 | | | | 0.05 | 0.76 |
| 23 | 0.1 | | | | 0.1 | 0.75 |
| 24 | | 0.1 | | | | 1.65 |
| 25 | | 0.1 | | | 0.05 | 0.82 |
| 26 | | 0.1 | | | 0.1 | 0.93 |
| 27 | | | 0.1 | | | 1.2 |
| 28 | | | 0.1 | | 0.05 | 0.96 |
| 29 | | | 0.1 | | 0.1 | 0.89 |
| 30 | | | | 0.1 | | 1.53 |
| 31 | | | | 0.1 | 0.05 | 0.86 |
| 32 | | | | 0.1 | 0.1 | 0.64 |

Table 5 summarizes the turbidity data.

Calfax DBA-40 is $C_{12}$ (branched) Diphenyl Disulfonic Acid surfactant available from Pilot Chemical Company.

Other surfactants were purchased from Millipore Sigma (400 Summit Drive Burlington 01803 United States).

It is evident from the table that the addition of Diphenyl Disulfonic Acid surfactant surfactants is able to reduce the turbidity for post-CMP cleaning solutions containing a wide range of surfactants.

Example 5

Formulations were made as per the table 6 and tested for turbidity.

Tergitol™ Min Foam 1× is a surfactant containing ethylene oxide and propylene oxide groups manufactured by Dow Chemicals.

TABLE 6

| Wt. % | 33 (Comparative) | 34 | 35 | 36 | 37 | 38 |
|---|---|---|---|---|---|---|
| Citric Acid | 2.8 | 2.8 | 2.8 | 2.8 | 15 | 15 |
| Oxalic Acid | 2.8 | 2.8 | 2.8 | 2.8 | 2 | 2 |
| Malonic Acid | 1.4 | 1.4 | 1.4 | 1.4 | | |
| Ammonium Polyacrylate (MW 2000-20000) | 0.5 | 0.5 | 0.5 | 0.5 | 0.5 | 0.5 |
| Tergitol Min-Foam 1x | 0.1 | 0.1 | 0.15 | 0.2 | 0.1 | 0.1 |
| Calfax DBA-40 | | 0.1 | 0.1 | 0.1 | 0.2 | 0.15 |
| Ammonium Fluoride | 4.9 | 4.9 | 4.9 | 4.9 | 7 | 7 |
| Turbidity (NTU) | >10 | 0.636 | 0.99 | 1.22 | 0.921 | 1.25 |

Table 6 summarizes the turbidity data.

It is evident from the table that the addition of Diphenyl Disulfonic Acid surfactant Calfax DBA-40 is able to reduce the turbidity for post-CMP cleaning solutions. All solutions containing Calfax DBA-40 have turbidity less than 2NTU, which is indicative of a clear transparent solution. This again shows the unexpected ability of the diphenyl disulfonic acid surfactants to solubilize Tergitol Min-Foam 1×.

Example 6

Surface tension of various surfactants was measured using sessile drop method with rame-hart 590 tool (manufactured by rame-hart instrument co. 19 Route 10 East, Suite 11 Succasunna, NJ 07876 USA). The tool uses contour fitting algorithm, and the profile coordinates of the contour of the drop to calculate the surface tension of the liquid. Table 6 provides the surface tension with various surfactants at 0.01% concentration in water.

TABLE 7

| | Concentration (wt. %) | Surface Tension (dynes/cm) |
|---|---|---|
| Calfax DBA -40 | 0.01 | 55.4 |
| Tergitol Minfoam 1x | 0.01 | 39.4 |
| Hostapur SAS | 0.01 | 41.0 |
| Tergitol 15-S-7 | 0.01 | 36.9 |
| Tergitol 15-S-9 | 0.01 | 41.6 |

It is evident from table 7, diphenyl disulfonic acid surfactant as represented by Calfax DBA-40 has high surface tension value at a given concentration. A second surfactant with low surface tension value is needed to reduce the surface tension of the cleaning solution.

While the invention has been described in conjunction with specific embodiments thereof, it is evident that many alternatives, modifications, and variations will be apparent to those skilled in the art in light of the foregoing description. Accordingly, departures may be made from such details without departing from the spirit or scope of the general inventive concept.

The invention claimed is:

1. A post Chemical Mechanical Planarization (CMP) cleaning composition consisting of:

A) at least one organic acid or its salt selected from the group consisting of oxalic acid, citric acid, maleic acid, malic acid, malonic acid, gluconic acid, glutaric acid, ascorbic acid, formic acid, acetic acid, ethylene diamine tetraacetic acid, glycine, α-alanine, cystine, or mixtures thereof;

B) at least two surfactants; wherein the first surfactant is a diphenyl disulfonic acid or its salt, and the second surfactant is either a non-ionic surfactant comprising ethylene oxide and/or propylene oxide groups, or an anionic C12-17 alkyl sulfonic acid surfactant, or a mixture thereof, wherein the second surfactant increases the zeta potential magnitude on a surface containing dielectric material, reduces the contact angle on cleaning surfaces, and has a surface tension of <50 dynes/cm at a concentration of 0.01 wt. % in water;

C) water; and

D) optionally at least one additive selected from the group consisting of:

1) a fluoride compound;

2) a water soluble polymer or copolymer;

3) a corrosion inhibitor different from additive 2 and selected from the group consisting of an oligomer or polymer comprising a monomer of ethyleneimine, propyleneimine, polyethyleneimine (PEI), or combinations thereof; wherein the molecular weight of the oligomer or polymer ranges from between 500 and 15000 daltons;

4) a biological preservative; and 5) a pH adjusting agent selected from the group consisting of nitric acid, sulfonic acid, phosphoric acid, ammonia hydroxide, potassium hydroxide, sodium hydroxide, quaternary ammonium hydroxide, or mixtures thereof; wherein the composition has a pH of between 1 and 7.

2. The post CMP cleaning composition of claim 1, wherein the first surfactant has a structure selected from the group consisting of (a)

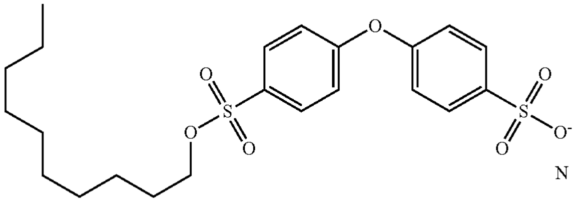

(b)

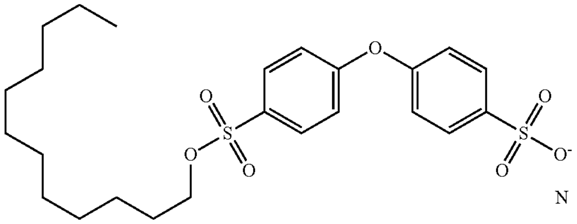

(c)

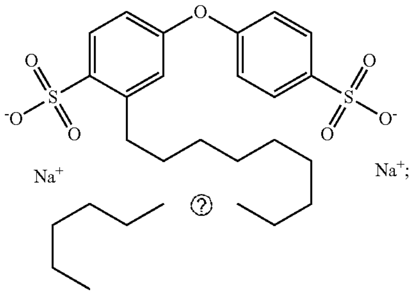

-continued (d)

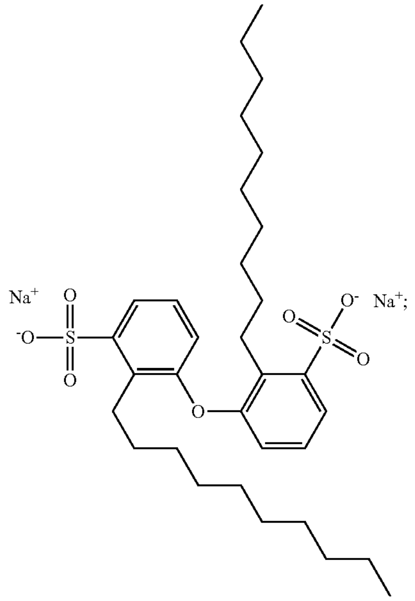

and (f)

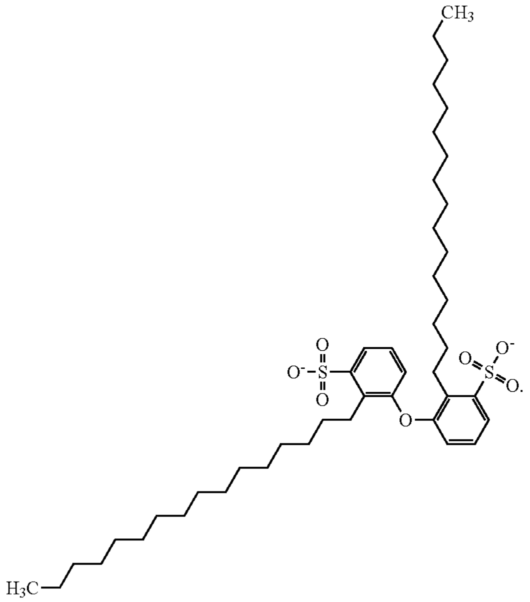

3. The post CMP cleaning composition of claim 1, wherein the at least one organic acid is selected from the group consisting of oxalic acid, citric acid, malonic acid, and combinations thereof.

4. The post CMP cleaning composition of claim 1, wherein:

1) the fluoride compound is selected from the group consisting of hydrofluoric acid, ammonium fluoride, ammonium bifluoride, quaternary ammonium fluorides, or mixtures thereof;

2) the water soluble polymer comprises a group selected from the group consisting of sulfonic acid group, acrylic acid group, or mixtures thereof, and the water soluble copolymer comprises monomers having a group selected from the group consisting of sulfonic acid group, acrylic acid group, or mixtures thereof;

4) the biological preservative is selected from the group consisting of tetramethylammonium chloride; tetraethylammonium chloride; tetrapropylammonium chloride; alkylbenzyldimethylammonium chloride; alkylbenzyldimethylammonium hydroxide; sodium chlorite; sodium hypochlorite; an isothiazolinone compound selected from the group consisting of methylisothiazolinone, methylchloroisothiazolinone, benzisothiazolinone or mixtures thereof, or mixtures thereof.

5. The post CMP cleaning composition of claim 1, wherein the composition further consists of the fluoride compound and the fluoride compound is ammonium fluoride.

6. The post CMP cleaning composition of claim 1, wherein the composition further consists of the water soluble polymer or copolymer and is selected from the group consisting of acrylic acid-acrylamido propane sulfonic acid copolymer, poly(acrylic acid), poly(meth-acrylic acid), poly (2-acrylamido-2-methyl-1-propanesulfonic acid, carboxymethyl cellulose, methyl cellulose, hydroxypropyl methyl cellulose, poly-(1-vinylpyrroliddone-co-2-dimethylaminoethyl methacrylate), poly(sodium 4-styrenesulfonate), poly (ethylene oxide), poly(4-sytrenesulfonic acid), polyacrylamide, poly(acrylamide/acrylic acid) copolymer, and combinations thereof; wherein the molecular weight of the water soluble polymer or copolymer ranges from 100 to 10,000,000.

7. The post CMP cleaning composition of claim 1, wherein the composition has a pH of 2 to 6.

8. The post CMP cleaning composition of claim 1, wherein the composition is diluted with water 2 to 500 times at point of use.

9. The post CMP cleaning composition of claim 1, wherein the composition has turbidity less than 2.5NTU.

10. The post CMP cleaning composition of claim 1, wherein the at least one organic acid is selected from the group consisting of oxalic acid, citric acid, malonic acid, or mixtures thereof; and the second surfactant is a C12-C17 secondary alkane sulfonic acid.

11. The post CMP cleaning composition of claim 1, wherein the organic acid is selected from the group consisting of oxalic acid, citric acid, malonic acid, or mixtures thereof, the second surfactant is a C12-C17 secondary alkane sulfonic acid, and the composition further consists of the fluoride compound selected from the group consisting of hydrofluoric acid, ammonium fluoride, ammonium bifluoride, quaternary ammonium fluorides, or mixtures thereof.

12. The post CMP cleaning composition of claim 1, wherein the organic acid is selected from the group consisting of oxalic acid, citric acid, malonic acid, or mixtures thereof, the second surfactant is a C12-C17 secondary alkane sulfonic acid, and the composition further consists of:

1) the fluoride compound selected from the group consisting of hydrofluoric acid, ammonium fluoride, ammonium bifluoride, quaternary ammonium fluorides, or mixtures thereof, and
2) the water soluble polymer comprising an acrylic acid group, or the water soluble copolymer comprising monomers having an acrylic acid group, or mixtures thereof.

13. A method of post Chemical Mechanical Planarization (CMP) cleaning semiconductor wafer comprising at least one surface selected from the group consisting of metallic film, dielectric film, and combinations thereof, comprising providing the semiconductor wafer;

providing the post Chemical Mechanical Planarization (CMP) cleaning composition of claim 1;

and cleaning the semiconductor wafer using the post CMP cleaning composition;

wherein the metallic film is selected from the group consisting of tungsten, copper, cobalt, ruthenium, aluminum, and combinations thereof.

14. The method of post Chemical Mechanical Planarization (CMP) cleaning of claim 13; where the method removes metallic residues selected from the group consisting of Fe, W, Ti, TiN and combinations thereof from the at least one surface.

15. A system for post Chemical Mechanical Planarization (CMP) cleaning semiconductor wafer comprising at least one surface selected from the group consisting of metallic film, dielectric film, and combinations thereof, comprising the semiconductor wafer; and the post Chemical Mechanical Planarization (CMP) cleaning composition of claim 1; and wherein the at least one surface is in touch with the post CMP cleaning composition and the metallic film is selected from the group consisting of tungsten, copper, cobalt, ruthenium, aluminum, and combinations thereof.

16. The post CMP cleaning composition of claim 1, wherein the at least one organic acid is selected from the group consisting of oxalic acid, citric acid, malonic acid, or mixtures thereof; and the second surfactant is a non-ionic surfactant comprising ethylene oxide and/or propylene oxide groups.

17. The post CMP cleaning composition of claim 1, wherein the at least one organic acid is selected from the group consisting of oxalic acid, citric acid, malonic acid, or mixtures thereof; the second surfactant is a non-ionic surfactant comprising ethylene oxide and/or propylene oxide groups, and further consists of the fluoride compound selected from the group consisting of hydrofluoric acid, ammonium fluoride, ammonium bifluoride, quaternary ammonium fluorides, or mixtures thereof.

18. The post CMP cleaning composition of claim 1, wherein the at least one organic acid is selected from the group consisting of oxalic acid, citric acid, malonic acid, or mixtures thereof; the second surfactant is a non-ionic surfactant comprising ethylene oxide and/or propylene oxide groups, and further consists of:

1) the fluoride compound selected from the group consisting of hydrofluoric acid, ammonium fluoride, ammonium bifluoride, quaternary ammonium fluorides, or mixtures thereof, and
2) the water soluble polymer comprising an acrylic acid group, or the water soluble copolymer comprising monomers having an acrylic acid group, or mixtures thereof.

* * * * *